Patented Nov. 1, 1949

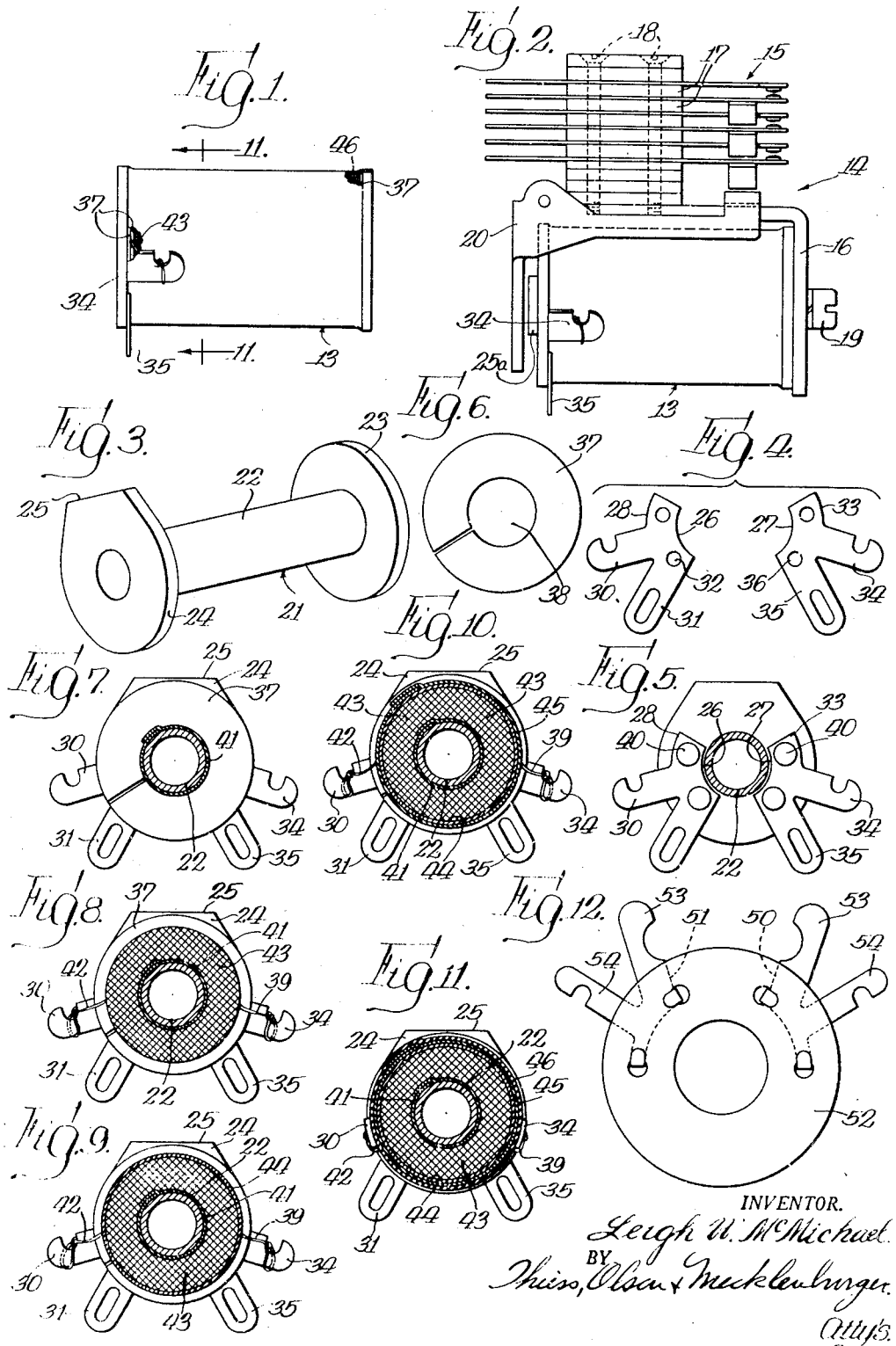

2,486,751

UNITED STATES PATENT OFFICE 2,486,751

RELAY COIL ASSEMBLY

Leigh W. McMichael, Chicago, Ill., assignor to Cook Electric Company, Chicago, Ill., a corporation of Illinois Application June 22, 1945, Serial No. 601,048

11 Claims. (Cl. 175—21)

This application relates to electric coils for relays and the like and to methods of manufacturing electric coils, more particularly to relatively small coils which will function properly under conditions of high humidity and relatively high temperatures and it is an object of the invention to provide improved coils and an improved method of manufacturing and assembling coils of the character indicated.

It is a further object of the invention to provide an improved method of manufacturing and assembling of electric coils for relays and the like whereby improper terminal connections are substantially prevented.

It is a further object of the invention to provide improved electrical coils for relays and the like which are simple to make, are rugged in construction and have long life.

It is a further object of the invention to provide electrical coils for relays and the like having improved terminal construction.

It is a further object of the invention to provide improved insulated coils for relays and the like which will withstand high relative humidity and relatively high temperatures for long periods of time.

Coils for operating relays have been used under varying conditions of temperature and relative humidity and coils for such applications have varying lengths of useful service depending on the materials used, the construction and the extremeness of the operating conditions encountered. Ordinarily the exactitude of the service is of a character where inspections can be made at proper intervals of time and faulty relays replaced, and limitations of space which determine the size of the relay are not so critical that very small relays have to be used. Consequently designs and tolerances are sufficiently liberal and relays are constructed to meet all requirements.

However, because of the wider variety of operating circumstances encountered, more recent control equipment involving the use of relays and coils is subjected to more exacting standards and prior apparatus has not been able to meet these standards adequately. Particularly is this true in airplane equipment where in a short space of time the conditions to which control equipment is subjected may change from high temperatures and high relative humidity, such as are peculiar to tropical jungle surroundings, to lower temperatures and lower relative humidity in temperate surroundings. It is also well known that the space available in airplanes, for example, for control equipment is small and the weight of all parts must be kept at a minimum. Furthermore, the relays frequently are mounted in relatively inaccessible places making it difficult to inspect them and to perform operations on them, such as repairing. Accordingly, it is a further object of the invention to provide an improved coil for relays and the like which is small, light in weight and has a high degree of reliability.

In some areas of the earth's surface where modern control equipment is used, for example the tropical jungle areas, the humidity and temperature conditions are very extreme. Temperatures over one hundred degrees Fahrenheit and relative humidities of over ninety percent are common atmospheric conditions and they extend over long intervals of time. Any articles in atmospheres of this type are usually damp and quite frequently are practically in a bath of water since very small decreases in temperature cause the moisture in the atmosphere to condense on the article surfaces. This situation occurs during the evening and night of every day and accordingly articles pass through a cycle varying from dampness to wet virtually every 24 hours, while the average temperature remains in the vicinity of one hundred degrees Fahrenheit. The continual dampness to which the coil is subjected eventually results in the insulation becoming saturated with water, with consequent lowering of ability to withstand electrical stress leading to insulation failure. Furthermore, the described conditions are very fertile surroundings for the growth of various fungi, for example, the tropical molds. These fungi and other forms of rotting attack the insulating material of coils causing a general and rapid deterioration. Coils constructed for use in such surroundings must not only be insulated to be able to withstand the electrical stresses involved, but must be constructed to prevent the growth of fungus and to prevent the moisture from coming into contact with the electrical parts of the coil if the coil is to have any but a very short length of life.

Accordingly, it is a further object of the invention to provide a coil for relays and the like which is sealed to prevent moisture from coming into contact with the coil and to prevent the growth of fungus on the coil.

In carrying out the invention in one form, a coil comprising a spool having a core and a flange at each end with a pair of terminals attached to one of the flanges is provided. A water impervious layer of insulation surrounds the core of the spool and insulating washers of water impervious material are placed adjacent the flanges. A winding is wound on the spool over the water impervious material and between the insulating washers. To insulate and protect the coil, an anti fungus film is provided on the coil, a layer of water impervious material surrounds the winding and a compression exerting layer of water impervious material covers the coil.

More particularly, the invention contemplates in assembling a coil comprising a core and a winding thereon having its ends attached to terminals on the core, the steps of treating the coil with a solution of antifungus material to prevent the formation of fungus on the coil, insulating the winding with a layer of water impervious material and forming a compression exerting water impervious coating around the coil.

In order to have a more thorough understanding of the invention, reference should now be had to the accompanying drawing, in which:

Fig. 1 is a side elevational view, partially broken away, of a coil embodying the invention;

Fig. 2 is a side elevational view of a typical type of relay that may embody the coil of Fig. 1;

Fig. 3 is a perspective view of the spool embodied in the coil of Fig. 1;

Fig. 4 is an elevational view of the coil terminals embodied in the coil of Fig. 1;

Fig. 5 is a sectional view of the spool shown in Fig. 3 with the terminals shown in Fig. 4 assembled thereto;

Fig. 6 is an elevational view of insulating washers embodied in the coil of Fig. 1;

Fig. 7 is a sectional view similar to Fig. 5 with the insulating washers of Fig. 6 and insulation assembled thereto;

Fig. 8 is a sectional view similar to Fig. 7 with the coil wound on the spool;

Fig. 9 is a sectional view similar to Fig. 8 with a layer of fungicide material surrounding the coil;

Fig. 10 is a sectional view similar to Fig. 9 with further insulation applied to the coil;

Fig. 11 is a sectional view of a completed coil taken substantially in the direction of the arrows 11—11 of Fig. 1; and Fig. 12 is an end elevational view of a modified form of spool and terminal construction.

Referring more particularly to the drawing, the invention is shown embodied in a coil 13 comprising a spool having coil terminals attached thereto, a winding wound on the spool and suitable insulation applied to the coil so that the coil will withstand conditions of high relative humidity and high temperature and will also prevent the formation of fungus growths as will be more particularly apparent as the description proceeds. In Fig. 2 the coil 13 is shown assembled to a relay 14 comprising a series of contacts 15 and a frame 16. Each contact arm of the series of contacts 15 is separated from the adjacent contact arm by an insulating spacer 17 and the series of contacts is attached to the frame 16 by means of the bolts 18. The coil 13 is attached to one end of the frame 16 by means of the bolt 19 and at the other end the armature 20 is pivoted so as to be acted upon by the coil to operate the contacts 15.

The winding is wound on a spool 21 which consists of a substantially cylindrical core 22 having the circular flange 23 at one end, the substantially circular flange 24 at the other end, the flange 24 having a flat surface 25 at its periphery which flat portion is adapted to bear against the underside of the frame 16 when the coil 13 is assembled thereto. While the flanges 23 and 24 are preferably formed integrally with the core 22, as shown, and the spool 21 may be made of any suitable water impervious material such, for example, as Bakelite, it will be understood that these parts may be separately formed and assembled to each other. The core 22 is hollow in order to receive the iron core 25a of the coil 13 which forms part of the magnetic circuit of the relay.

To bring out the ends of the winding from the coil the terminals 26 and 27 are provided, each terminal including also a portion to which the external circuit for supplying the coil with current are connected. The terminal 26 consists of a bridging portion 28 from which the integrally formed connectors 30 and 31 extend outwardly. The connector 30 has a U-shaped cut-out portion near its outer end to which one end of the winding is attached and the connector 31 has an elongated slot near its outer end to which the external circuit is to be connected. The bridging portion 28 includes two holes 32 for attaching the terminal 26 to the spool. The terminal 27 is substantially identical with terminal 26 and includes a bridging member 33 and the two connectors 34 and 35 integrally formed therewith and extending outwardly therefrom. The connector 34 has a U-shaped cut-out portion near its outer end and the connector 35 has an elongated slot near its outer end for receiving the end of the winding and the external circuit, respectively, and the bridging member 33 is provided with holes 36 for attaching the terminal 27 to the spool. The inside portion of each of the bridging members 28 and 33 is substantially circular in character so that when these terminals are attached to the spool the curved portions are adapted to lie closely adjacent to the curved surface of the core 22, as shown best in Fig. 5. The terminals 26 and 27 may be formed in any suitable manner such, for example, as by stamping from flat metal stock.

In Fig. 6 there is shown a thin, flexible washer 37 which is of the same relative diameter as the flanges 23 and 24 and is provided with a central opening 38 which is of sufficient diameter to fit relatively loosely around the core 22. The washer 37 is split as shown so that it may be assembled to the spool, as will become clear and may be formed of any suitable electrically resistant and water impervious material such, for example, as mica.

With the spool 21 constructed as shown in which the end flanges 23 and 24 are integral with the core 22 the coil winding is wound on the spool, for example, by placing the spool on a rotating spindle and feeding the coil wire to it. The spool 21 is prepared to have the winding wound thereon by riveting the terminals 26 and 27 to the inside surface of the flange 24 by means of the rivets 40 as shown in Fig. 5 so that in the completed coil the terminals are between the flange and coil winding. The terminals 26 and 27 are attached to the flange 24 in a symmetrical fashion so that the connectors 31 and 35 lie adjacent to each other and the connectors 30, 31, 34 and 35 extend substantially radially outward from the core 22. Following the step of attaching the terminals, one or more layers of insulation 41 are wrapped around the core 22 and insulating washers 37 are placed around the core 22 and the insulation 41 adjacent the flanges 23 and 24. The insulating washers are placed around the core by springing the split ends of each washer apart, placing the core into the hole 38 and allowing the ends to spring back together. One washer placed adjacent the flange 23 and two washers placed adjacent the flange 24 for a purpose to be described (see Fig. 1). The washers 37 shield the winding from the spool flanges and furthermore prevent the winding from coming into contact with the terminals 26 and 27 and the rivets 40.

The insulation 41 may be any electrical insulating water impervious material such, for example, as cellulose acetate or cellulose acetate butyrate or other well known impregnated materials.

Fig. 7 shows the assembly as thus far described. The winding 43 is wound on the spool by first attaching one end of the conductor to the connector 30 as shown in Fig. 8 by well known means such as soldering, for example. The connector 42 forming part of the winding conductor is then passed between the two washers 37 adjacent the flange 24 and thereafter the conductor is wound on the spool by rotating the spool on a mandrel until the winding is completed with the required number of turns after which the remaining end of the conductor is attached to the connector 34 through a connector 39 by means such as soldering. The connectors 39 and 42 from the winding to the connectors 30 and 34 are made in a slack manner so that they may remain relatively loose. Therefore, when the connectors 30 and 34 are bent or the coil itself vibrates there will be a lesser tendency for the winding to become separated from the connectors 30 and 34. The connector 42 is placed between the two washers 37 adjacent the flange 24 to prevent the connector from coming into contact with the remainder of the winding and, therefore, chafing with its resulting wear is prevented.

After the conductor has been wound on the spool to form the winding 43 the assembly is provided with a layer of fungus-resisting material 44 as shown in Fig. 9. The fungus-resisting material may be applied to the spool and winding by any well known means, for example, as by dipping the assembly into a bath of fungus-resisting material and thereafter allowing it to dry. The fungus-resisting material may be any substance which forms an impermeable film around the coil so that the fungus forming spores can not come into contact with and lodge on the winding or other parts of the coil. In addition, this fungus-resisting material forms a relatively hard smooth surface upon which fungus does not readily grow. One form of such a fungicide may be phenol mercuro salycilate as disclosed in the U. S. Signal Corps publication entitled Tropicalization, published by the Signal Corps in June 1944.

In order to insulate the winding from the surroundings, one or more layers 45 of insulating material are wrapped around the winding as shown in Fig. 10 and while only one layer has been shown it will be clear that as many layers may be used as are necessary to insulate the winding for the particular voltage to be used and for otherwise protecting the coil. The insulating material forming the layer 45, similarly to the insulating layer 41, may be made of any electrically resistant and water impervious material, such as cellulose acetate or cellulose acetate butyrate.

After the layer or layers of insulation 45 are applied to the coil winding 43, the completed assembly is made water impervious by applying a protective coating 46 around the completed winding and core. The protective coating is preferably made of a compound having a rubber base which is in liquid form so that the coil may be dipped therein to form a film of the coating around it after which the film is hardened by drying. The protective coating having a rubber base contracts in drying and thereby holds the layer or layers of insulation 45 tightly gripped about the coil winding. Therefore, there will be no air spaces either between the protective coating 46 and the insulation 45 or between the insulation 45 and the film of the fungus material 44. Air spaces, if allowed to be present, would form focal points where rotting and other forms of deterioration begin. Furthermore, having the rubber coating gripping the material tightly prevents chafing between the various layers of insulation and the fungicide layer, and accordingly lessens the tendency of the insulation to deteriorate.

Having a layer or layers of insulating material 41 on the inside surface of the winding 43 and having the insulating split washers 37 between the winding and the flanges 23 and 24 along with the fungicide layer 44 surrounded by the layer or layers of water impervious material 45 and a sealing coating 46 which exerts compression on the insulating layer 45 forms a completely sealed coil so that no moisture can seep into the vital parts of the coil to cause its deterioration. In this manner not only is the fungicide layer 44 protected from wearing away and otherwise deteriorating, but the insulating layers 45 are similarly protected.

Either before or after the application of the rubberized protective coating 46, the connectors 30 and 34 are bent inwardly to lie parallel to the surface of the winding as shown in Figs. 1 and 11. The connections from the winding 43 to the terminals are thus out of the way and a workman connecting the coil to its external circuit has only two projecting terminals to work with. In connection with the first step of riveting the terminals 26 and 27 to the flange 24, it was pointed out that the connectors 31 and 35 are arranged to lie adjacent each other, and it was also pointed out that one end of the winding is connected to the connector 30 and the other end of the winding is connected to the connector 34 which connectors are similar to each other. Therefore, the workman in assembling the coil always assembles the conductor ends to connectors of the same shape, and hence, the possibility of incorrectly connecting the winding is decreased.

The construction of the coil involves three major steps of assembly. The first step is the preparation of the core or spool 21, which includes attaching the terminals 26 and 27 to the flange 24, as described, placing the insulating layer 41 next to the core 22, followed by placing the insulating washers 37 adjacent the flanges 23 and 24. The second step involves winding the coil on the spool and includes first attaching a leading-in portion of the conductor to the connector 30, winding the conductor on the spool, followed by connecting a leading-out portion to the connector 34. The final step in the process includes providing a layer or film of fungus-resisting material around the coil, applying a layer or layers of insulation to the winding to electrically insulate the winding as well as to protect the layer of fungus material, followed by providing a sealing protective coating of rubber base material which tightly grips the insulating material and holds it firmly against the winding. Bending the connectors 30 and 34 to lie parallel to the winding places these connections out of the way so as not to interfere with further use of the coil.

In Fig. 12 a modified form of core or spool construction is shown in which two terminals 50 and 51 are attached to one flange 52 of the spool. The terminals 50 and 51 are each provided with projecting ears or tongues which are inserted through holes provided in the flange as shown after which the tongues are bent over to hold the terminals to the flange. Each of the connectors 50 and 51 is provided with two connectors 53 and 54 which extend substantially radially from the flange 52 when the terminals are assembled thereto. The connectors 53 are arranged to lie adjacent each other and are provided with similar semi-circular cut-out portions to which the leads coming to the coil from the external circuit are connected and the connectors 54 are provided with U-shaped cut-out portions to which the ends of the winding are connected substantially as described for the terminals 26 and 27.

Without further elaboration, the foregoing will so fully explain the gist of my invention that others may, by applying current knowledge, readily adapt the same for use under varying conditions of service, without eliminating certain features which may properly be said to constitute the essential items of novelty involved, which items are intended to be defined and secured to me by the following claims.

I claim:

1. A coil comprising a core including a pair of flanges, a pair of terminals attached thereto, a winding on said core having one of its ends attached to one of said pair of terminals and having the other of its ends attached to the other of said pair of terminals, an anti fungus film surrounding said winding and flanges immediately adjacent thereto, a layer of water impervious material around said winding and overlying said fungus film, and a water impervious compression exerting layer covering said layer and the anti fungus film surrounding said flanges.

2. A coil comprising a spool having a core and a flange at each end, a pair of terminals associated with said spool, a water impervious layer of insulation surrounding said core, an insulating washer of water impervious material adjacent each of said flanges, a winding wound on said spool over said water impervious layer and between said insulating washers, an anti fungus film surrounding said winding and said flanges, another layer of water impervious insulation surrounding said winding and overlying said fungus film, and a compression exerting layer of water impervious material covering said other layer and the anti fungus film on said flanges.

3. A coil comprising a spool having a core and a flange at each end, a layer of cellulose acetate surrounding said core, an insulating washer of water impervious material against each of said flanges, a winding wound on said spool over said cellulose acetate layer and between insulating washers, an anti fungus film surrounding said winding and flanges immediately adjacent thereto, another layer of cellulose acetate surrounding said winding and overlying said fungus film, and a covering of rubber-like material surrounding said other cellulose acetate layer and the anti fungus film surrounding said flanges.

4. A coil comprising a spool having a core and a flange at each end, a layer of cellulose acetate surrounding said core, an insulating washer of water impervious material against each of said flanges, a winding wound on said spool over said cellulose acetate layer and between said insulating washers, an anti fungus film surrounding said winding and flanges immediately adjacent thereto, another layer of cellulose acetate surrounding said winding and overlying said fungus film, and a covering of rubber-like material surrounding said other cellulose acetate layer and the anti fungus film surrounding said flanges, said rubber-like covering exerting compression to hold said other coating of cellulose acetate against said anti fungus film.

5. A coil comprising a spool having a core and a flange at each end, a layer of cellulose acetate butyrate surrounding said core, an insulating washer of water impervious material against each of said flanges, a winding wound on said spool over said cellulose butyrate layer and between said insulating washers, an anti fungus film surrounding said winding and said flanges immediately adjacent thereto, another layer of cellulose acetate butyrate surrounding said winding and overlying said anti fungus film, and a covering of rubber-like material surrounding said other cellulose acetate butyrate layer and the anti fungus film surrounding said flanges.

6. A coil comprising a preformed core including a flange at each end and having a pair of two-part terminals attached thereto, a winding on said core having one of its ends attached to one part of one of said terminals and having the other of its ends attached to a corresponding part of the other of said pair of terminals, a film of fungicide material on said winding and flanges immediately adjacent thereto, a layer of water impervious insulating material around said winding and overlying said fungicide material, and a compression exerting covering over said layer and the fungicide material on said flanges.

7. A coil comprising a preformed core including a flange at each end thereof and having a pair of two-part terminals attached thereto, a winding wound on said core having one of its ends attached to one part of one of said terminals and having its other end attached to a corresponding part of the other of said pair of terminals, a film of fungus resistant material on said winding and flanges immediately adjacent thereto, a layer of water impervious insulating material around said winding and overlying said fungus resistant film, and a covering of water impervious material surrounding said insulating material and the fungus resistant material on said flanges, said covering of water impervious material exerting compression on said insulating material to hold said insulating material against said fungus resistant material.

8. A coil comprising a preformed core including a flange at each end thereof having a pair of two-part terminals attached thereto and extending radially therefrom, a winding wound on said core having one of its ends attached to one part of one of said terminals and having its other end attached to a corresponding part of the other of said pair of terminals, a film of fungus resistant material on said winding and flanges immediately adjacent thereto, a layer of water impervious insulating material around said winding overlying said fungus resistant material, and a covering of material shrunk over said water impervious insulating material and the fungus resistant material on said flanges, said covering of material exerting compression on said insulating material, said terminal parts having winding ends attached lying substantially parallel to the winding surface inwardly from the associated flange.

9. A coil comprising a spool including a flange at each end thereof, a winding on said spool, a pair of substantially similar terminal members attached to one of said flanges and extending radially outward thereof, each of said terminal members including two connecting elements having different end configurations, said connecting elements with similar end configurations having the winding connected thereto, a film of fungicide material on said winding and flanges immediately adjacent thereto, a layer of water impervious insulating material around said winding overlying said fungicide film, and a compression exerting water impervious material around said water impervious insulating material and the fungicide film on said flanges.

10. A coil comprising a spool including a flange at each end thereof, a pair of substantially similar terminal members, each of said terminal members including two connecting elements having different end configurations, said terminal members being symmetrically attached to one of said flanges with said connecting elements extending radially outwardly and with connecting elements of said terminal members having similar end configurations arranged adjacent each other, a winding on said spool having one end attached to a connecting element on one of said terminal members and having the other end connected to a correspondingly positioned connecting element on the other of said terminal members, said connecting elements having the winding ends attached lying substantially parallel to the surface of said winding inwardly from the associated flange, a film of fungicide material on said winding and flanges immediately adjacent thereto, a layer of water impervious insulating material around said winding overlying said fungicide film, and a compression exerting water impervious material around said water impervious insulating material and the fungicide film on said flanges.

11. A coil comprising a spool including a flange at each end thereof, a pair of terminal members attached to one of said flanges, each of said members including two connector elements extending substantially radially outward of said spool, a winding on said spool having one end attached to one connecting element of one of said terminal members and having the other end attached to a corresponding connecting element of the other terminal member, a film of fungicide material on said winding and flanges immediately adjacent thereto, a layer of water impervious insulating material around said winding overlying said film of fungicide material, said connecting elements with said winding ends attached lying substantially parallel to said winding surface inwardly from the associated flange, and a compression exerting water impervious material around said water impervious insulating material, the fungicide film on said flanges and said winding attached connecting elements.

LEIGH W. McMICHAEL.

REFERENCES CITED

The following references are of record in the file of this patent:

UNITED STATES PATENTS

| Number | Name | Date |
| --- | --- | --- |
| 830,419 | Downes | Sept. 4, 1906 |
| 1,485,289 | Peterson | Feb. 26, 1924 |
| 1,633,576 | Franks | June 28, 1927 |
| 1,819,638 | Connor | Aug. 18, 1931 |
| 1,881,077 | Hall | Oct. 4, 1932 |
| 1,883,932 | Kazenmaier et al. | Oct. 25, 1932 |
| 1,888,275 | Larsen | Nov. 22, 1932 |
| 1,997,198 | Ogg | Apr. 9, 1935 |
| 2,177,266 | Schupp | Oct. 24, 1939 |
| 2,195,233 | Boyer | Mar. 26, 1940 |
| 2,222,639 | Pirk | Nov. 26, 1940 |
| 2,252,208 | Rosing | Aug. 12, 1941 |
| 2,275,967 | Keillor | Mar. 10, 1942 |
| 2,320,201 | Szilard | May 25, 1942 |